United States Patent [19]

Maupin et al.

[11] Patent Number: 5,689,548

[45] Date of Patent: Nov. 18, 1997

[54] EMERGENCY CALL BACK USING MSC NUMBERS

[75] Inventors: Alain Guy Maupin, Richardson; Vladimir Alperovich, Dallas, both of Tex.

[73] Assignee: Ericsson, Inc., Research Triangle Park, N.C.

[21] Appl. No.: 651,982

[22] Filed: May 21, 1996

[51] Int. Cl.⁶ .............. H04Q 7/00; H04Q 9/00; H04M 11/00; H04M 11/04
[52] U.S. Cl. .................. 379/59; 379/58; 379/45; 455/33.1
[58] Field of Search .............. 379/58, 59, 60, 379/114, 45–46, 48–49; 455/33.1, 33.2, 94

[56] References Cited

U.S. PATENT DOCUMENTS

| | | | |
|---|---|---|---|
| 4,924,491 | 5/1990 | Compton et al. | 379/37 |
| 4,979,204 | 12/1990 | Oyama | 379/58 |
| 5,161,180 | 11/1992 | Chavous | 379/45 |
| 5,245,651 | 9/1993 | Takashima et al. | 379/96 |
| 5,311,574 | 5/1994 | Livanos | 379/88 |
| 5,339,351 | 8/1994 | Hoskinson et al. | 379/45 |
| 5,347,568 | 9/1994 | Moody et al. | 379/45 |
| 5,388,145 | 2/1995 | Mulrow et al. | 379/45 |
| 5,438,616 | 8/1995 | Peoples | 379/201 |
| 5,452,353 | 9/1995 | Menezes | 379/355 |
| 5,467,381 | 11/1995 | Peltonen et al. | 379/58 |
| 5,475,745 | 12/1995 | Boyle | 379/201 |
| 5,479,482 | 12/1995 | Grimes | 379/59 |
| 5,481,603 | 1/1996 | Gutierrez et al. | 379/221 |
| 5,497,412 | 3/1996 | Lannen et al. | 379/60 |
| 5,537,457 | 7/1996 | Lantto et al. | 379/58 |
| 5,557,664 | 9/1996 | Burns et al. | 379/114 |
| 5,596,625 | 1/1997 | LeBlanc | 379/90 |

OTHER PUBLICATIONS

Ballard et al., Cellular Mobile Radio as an intelligent Network Application, (literature)(pp. 389–399), 1995.

*Primary Examiner*—Curtis Kuntz
*Assistant Examiner*—Binh K. Tieu
*Attorney, Agent, or Firm*—Jenkens & Gilchrist, P.C.

[57] ABSTRACT

When establishing an emergency call connection towards a Public Safety Answering Point (PSAP) terminal for a mobile subscriber, instead of transmitting the Mobile Station Integrated Service Directory Number (MSISDN) assigned to the mobile station, a directory number assigned to the serving mobile switching center/visitor location register (MSC/VLR) is transmitted as the Calling Party Number. The MSISDN number is stored into the Generic Address Parameter (GAP) within the transmitted Initial Address Message (IAM) signal. When the PSAP attempts to call back the mobile station in response to a disconnection of the original emergency call connection, the PSAP transmits another IAM signal with the received MSC directory number as the Called Party Number. Once the setup signal is routed to the serving MSC/VLR, an application module within the serving MSC/VLR extracts the MSISDN from the GAP to call back the proper mobile station.

23 Claims, 4 Drawing Sheets

INITIAL ADDRESS 150

| PARAMETER | LENGTH |
|---|---|
| MESSAGE TYPE | 1 |
| NATURE OF CONNECTION INDICATORS | 1 |
| ⋮ | |
| (CdPn) CALLED PARTY NUMBER | 2-11 — 220 |
| ⋮ | |
| (CgPn) CALLING PARTY NUMBER | 5-12 — 200 |
| ⋮ | |
| (GAP) GENERIC ADDRESS | 6-13 — 210 |
| | |

*FIG. 4*

EMERGENCY CALL BACK USING MSC NUMBERS

CROSS REFERENCE TO RELATED APPLICATION

This application is related to U.S. application for patent Ser. No. 08/655,349, filed May 21, 1996, entitled "Emergency Call Back for Roaming Mobile Subscribers" (Docket No. 27943/69).

BACKGROUND OF THE INVENTION

1. Technical Field of the Invention

The present invention relates to a mobile telecommunications network and, in particular, to the emergency call back of a mobile subscriber from a Public Safety Answering Point (PSAP).

2. Description of Related Art

The Emergency Service Bureau (ESB) or more commonly known in the United States as 9-1-1 service provides emergency assistance to a person in dire need of help. A mobile subscriber seeking emergency service merely has to dial a short unique number (such as 911 in the U.S.) to establish a fast emergency call connection with one of the Public Safety Answering Point (PSAP) terminals providing the ESB service. While establishing the emergency call connection with the PSAP terminal, the directory number associated with the mobile station is conventionally transmitted to the PSAP. The transmitted directory number or Mobile Station Integrated Service Directory Number (MSISDN, also known as Personal Station Integrated Service Directory Number—PSISDN) is utilized by the PSAP to identify the caller and is also available, if needed, to call back the mobile subscriber if the connection is disconnected.

While establishing a call back connection with the mobile station in need, it is desirable to re-establish the call connection as quickly as possible. However, by utilizing the received MSISDN number, a setup request signal has to be routed to the Gateway Mobile Switching Center (GMSC) associated with the destination Public Land Mobile Network (PLMN), the home location register (HLR) storing subscriber information related to the mobile station has to be interrogated, and the setup request signal has to be rerouted to a particular mobile switching center (MSC) currently serving the mobile station. Such interrogation and rerouting procedures delay the call setup and hinder the ESB from providing effective assistance to the mobile station. Furthermore, the call back may be charged as a long distance call to the mobile subscriber if the mobile station is currently being served by a visited PLMN.

With the development of the Personal Communications System (PCS) and the Global System for Mobile (GSM) communications, the concept of temporary local directory number (TLDN) has been introduced to alleviate the above problems. Each MSC and visitor location register (VLR, usually co-located with the MSC and collectively referred to as a MSC/VLR) contains a list of temporary local directory numbers. Each TLDN is a wireline directory number representing that particular MSC/VLR. Whenever an emergency call setup request is received from a mobile station, the next available TLDN from the list is selected for that particular mobile station and transmitted to the PSAP as the Calling Party Number (Cgpn). In case the PSAP wishes to establish a call back connection with the mobile station, the received TLDN is used as the Called Party Number (Cdpa). Since the received TLDN is a wireline directory number assigned to the serving MSC, no mobile system interrogation of the home HLR or rerouting of the setup message has to be performed. Instead, the call connection is established directly between the PSAP and the serving MSC. Once the call back connection request is received by the serving MSC, the serving MSC/VLR determines the MSISDN associated with this particular TLDN and establishes a call connection with the appropriate mobile station to complete the call back. Furthermore, since the serving PSAP and the serving MSC/VLR are usually located within the same PLMN, long distance charges will not be incurred for the call back connection.

Even though the above TLDN solution alleviates some of the emergency call back problems, there still exists certain system limitations. Because the TLDN list contains a limited number of directory numbers, the numbers have to be recycled. In order to determine when the numbers can be reused, the serving MSC/VLR marks the assigned numbers as available after a certain period of time. For example, forty-five minutes after being assigned, a TLDN assigned to a particular mobile station is released. As a result, if a call back request from the PSAP is received after the corresponding TLDN has already been released, the call back request fails. Furthermore, if the number of emergency calls exceeds the number of available TLDNs, subsequently received emergency calls are processed without assigning TLDNs. Alternatively, previously assigned TLDNs have to be overwritten with the subsequently received MSISDNs. Such a mechanism creates uncertainty and restrictions within the mobile telecommunications system.

Accordingly, there is a need for a mechanism to enable a PSAP terminal to call back the original mobile station without having the time and system limitations imposed by the above TLDN implementation.

SUMMARY OF THE INVENTION

The present invention discloses a method and apparatus for calling backing a mobile subscriber by a Public Safety Answering Point (PSAP) terminal in response to a disconnection of an initial emergency connection that existed between the mobile subscriber and the PSAP terminal. Whenever a mobile switching center (MSC) serving a particular mobile station receives a request to originate an emergency call connection towards the PSAP, the directory number associated with the mobile station is replaced with the directory number assigned to the serving MSC as the Calling Party Number (Cgpn) in a first setup signal. The directory number representing the mobile station is further encapsulated into one of the optional parameters within the transmitted first setup signal. The first emergency call connection is then established between the mobile station and the PSAP.

If the PSAP requests a call back toward the mobile station in response to a disconnection of the first emergency call connection, the received MSC directory number is utilized as the Called Party Number (Cdpn) in a second setup signal from the PSAP to the serving MSC. By utilizing the MSC directory number, the call connection is directly established with the serving MSC/VLR without routing through the mobile telecommunications network. The received mobile station directory number is further encapsulated into the second setup signal and transmitted back to the serving MSC/VLR. The serving MSC/VLR then extracts the encapsulated mobile station directory number from the received second setup signal and establishes a call back connection between the PSAP and the mobile station.

BRIEF DESCRIPTION OF THE DRAWINGS

A more complete understanding of the method and apparatus of the present invention may be had by reference to the following detailed description when taken in conjunction with the accompanying drawings wherein:

FIG. 4 is a block diagram illustrating the data structure of an Initial Address Message (IAM) for storing an MSC directory number and the Mobile Station Integrated Service Directory Number (MSISDN) associated with a mobile station.

DETAILED DESCRIPTION OF THE DRAWINGS

Figure 1:
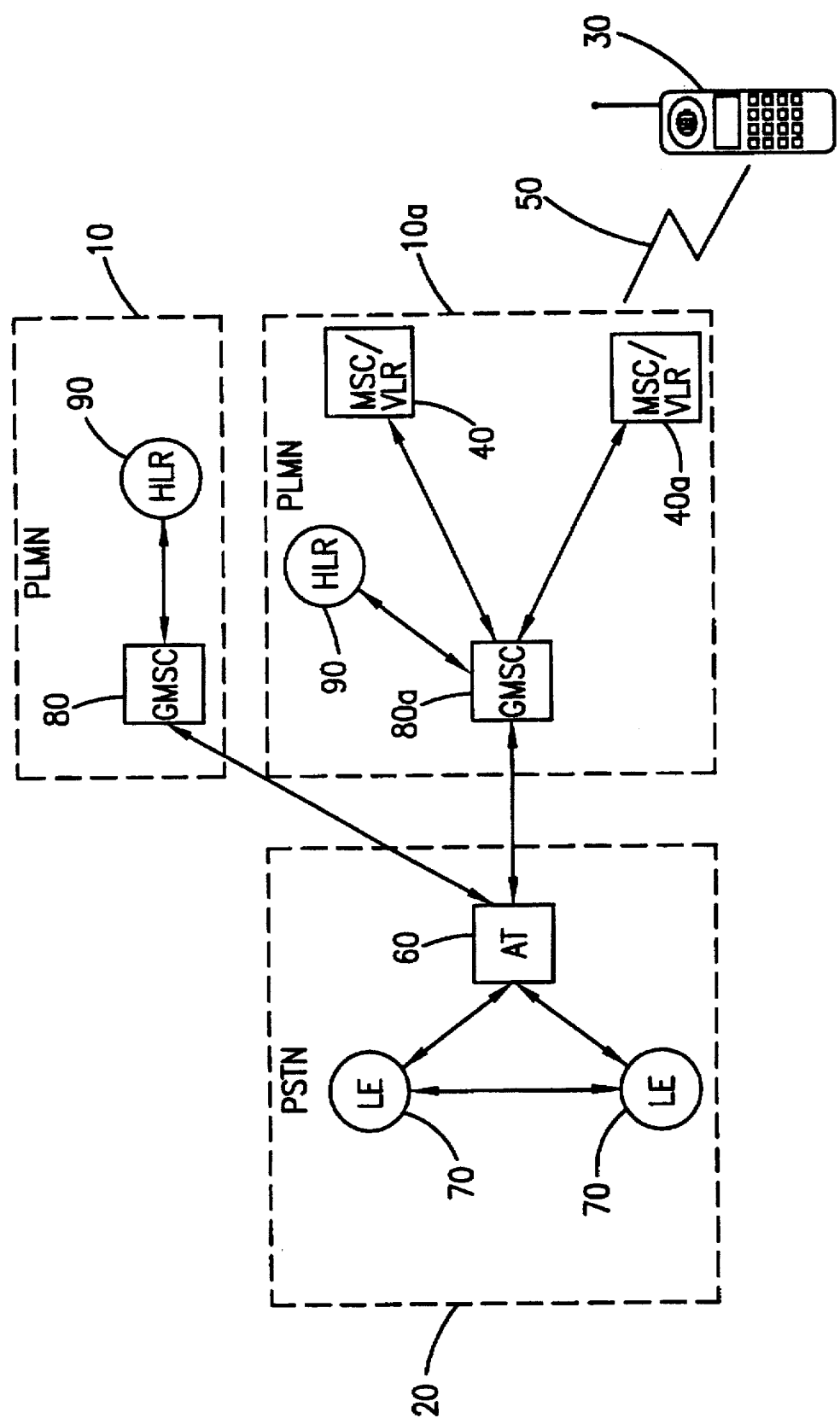
FIG. 1 is a block diagram illustrating the network interconnection of multiple Public Land Mobile Networks (PLMN) to a Public Switched Telephone Network (PSTN)

FIG. 1 is a block diagram illustrating the network interconnection of multiple Public Land Mobile Networks (PLMN) 10 to a Public Switched Telephone Network (PSTN) 20. A mobile station 30 (also known as a mobile terminal or equipment) is associated with one of the PLMNs 10 as the home PLMN 10a. Within each PLMN 10, there are a number of different mobile switching centers (MSC, or also referred to as an MSC/VLR) 40 servicing the geographic area covered by the network. Each MSC/VLR 40 communicates with the mobile station 30 via a radio channel 50.

Within each PLMN 10, there exists a Gateway Mobile Switching Center (GMSC) 80 for routing incoming calls intended for the mobile station 30 to the appropriate MSC/VLR 40. As an illustration, if the PLMN 10a is the home PLMN for the mobile station 30, a call initiated by one of the local exchanges (LE) 70 within the PSTN 20 is first routed to the GSMC 80a via the access tandem (AT) 60. The GSMC 80a then sends a signal requesting routing information to the home location register (HLR) 90 serving the mobile station 30 (this step is hereinafter referred to as HLR interrogation). The HLR 90 (which stores subscriber information and keeps track of the current location of the mobile station 30) returns a routing instruction back to the GMSC 80a. The returned routing instruction includes a network address indicating which MSC/VLR 40 is currently serving the mobile station 30. Upon receipt of such routing information, the GMSC 80a transmits the incoming call to the indicated MSC/VLR 40a. The serving MSC/VLR 40a then establishes a call connection over radio link 50 with the mobile station 30 located within its MSC/VLR serving area.

Such HLR interrogation by the GMSC 80 is necessary because the mobile station 30 is not tied to a fixed line or geographic location. Because the mobile station 30 can travel freely into any one of the MSC/VLR areas within a given PLMN 10, the MSC/VLR 40 serving the mobile station does not stay constant. Whenever the mobile station 30 travels into a different MSC/VLR coverage area, or the unit is turned on for the first time, the serving MSC/VLR 40 performs a location update process with the home HLR 90 to inform the HLR 90 of the mobile station's current location. As a result, the home HLR 90 retains the current location information regarding the mobile station 30 regardless of which MSC/VLR 40 is currently serving the mobile station 30. Subsequently, whenever the GSMC 80 interrogates the home HLR 90, the HLR 90 is able to provide the network address of the MSC/VLR 40 currently serving the mobile station 30. Utilizing such location information received from the home HLR 90, the GSMC 80 routes the incoming call to the specified MSC/VLR 40.

Figure 2:
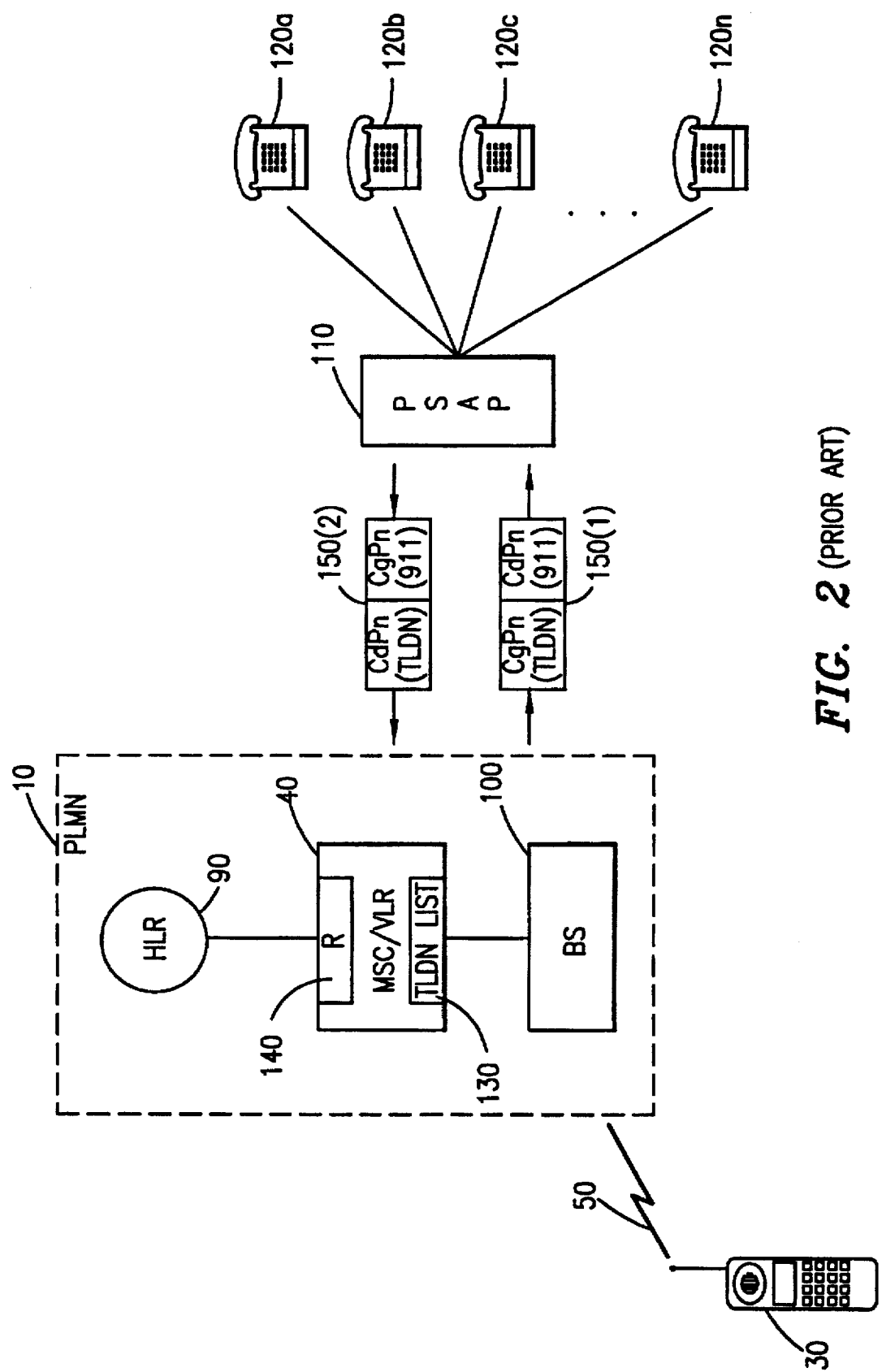
FIG. 2 is a block diagram illustrating the establishment of an emergency call connection between a mobile station and a Public Safety Answering Point (PSAP) terminal.

FIG. 2 is a block diagram illustrating the establishment of an emergency call connection between a mobile station 30 and a Public Safety Answering Point (PSAP) 110. The Emergency Service Bureau (ESB) or more commonly known in the United States as 9-1-1 service provides emergency service to a person in need of help. In order to minimize human effort, a mobile subscriber seeking emergency service merely has to dial a short unique number (such as 911 in the U.S.) to request an emergency call connection with one of the Public Safety Answering Point (PSAP) terminals 120a–120n providing the ESB service. A signal requesting an emergency call connection, such as an emergency call setup signal based on Direct Transfer Application Protocol (DTAP), is transmitted by the mobile station 30 over a dedicated channel of the radio link 50. The MSC/VLR 40 within the serving PLMN 10 receives the transmitted emergency call setup signal via a base station (BS) 100. The serving MSC/VLR 40 then determines that this is a request for an emergency call connection and transmits a network setup request signal 150, such as an Initial Address Message (IAM), towards the PSAP 110 requesting a call connection. The PSAP 110 receives the setup request signal and establishes a connection between the mobile station 30 and one of the available PSAP terminals 120a–120n.

The transmitted IAM signal 150 includes Calling Party Number (Cgpn) and Called Party Number (Cdpn) parameters. The Cdpn parameter is analyzed by the telecommunications network to determine the intended destination node for the transmitted signal, and the Cgpn parameter is later utilized by the destination node to call back or return a signal back to the originating node. As an illustration, the Cdpn parameter for the first IAM message 150(1) transmitted from the MSC/VLR 40 towards the PSAP 110 contains the MSISDN value assigned to the mobile station 30. Utilizing the first IAM message 150, a first call connection between the mobile station 30 and one of the PSAP terminals 120 connected to the PSAP 110 is established. In case the first call connection between the PSAP terminal 120 and the mobile station 30 is disconnected, the PSAP 110 initiates a call back request to establish a call connection with the mobile station 30 by transmitting a second IAM signal 150(2). The received MSISDN value in the Cgpn parameter of the first IAM signal 150(1) is utilized as the Cdpn for the second IAM signal 150(2). Since the received MSISDN number is a mobile directory number, in order to establish a call connection with the mobile station 30, the interrogation of the home HLR 90 and the rerouting of the call setup message by the GMSC 80 (not shown in FIG. 2) need to be performed in a manner described in FIG. 1. However, such mobile call setup procedures delaying the call connection between the PSAP 110 and the mobile station 30 is undesirable while establishing an emergency call connection.

With the development of the PCS, the concept of temporary local directory number (TLDN) has been introduced to somewhat alleviate the above problem. Whenever the serving MSC/VLR 40 receives an emergency call setup signal from the mobile station 30, the next available directory number from the TLDN list 130 is selected for that particular mobile station 30. The register (R) 140 within the serving MSC/VLR 40 further correlates the selected TLDN with the MSISDN representing the mobile station 30. The selected TLDN is then transmitted as the Cgpn towards the PSAP 110 when transmitting the first IAM signal 150(1) to establish a first emergency call connection between the mobile station 30 and the PSAP terminal 120. In case the first emergency call connection is disconnected between the two parties and the PSAP 110 wants to call back the mobile station 30, the received TLDN is transmitted as the Cdpn for the second IAM signal 150(2). After receiving the second IAM signal 150(2), the serving MSC/VLR 40 retrieves the MSISDN associated with the received TLDN from the register (R) 140 and establishes a call back connection with the appropriate mobile station 30. Accordingly, by utilizing the received TLDN representing a wireline address, the above mentioned incoming mobile call setup procedures can be avoided and the new call connection between the two parties directly established.

Even though the above TLDN solution alleviates the delays mandated by the handling of incoming calls within a mobile telecommunications system, there still exists certain undesirable system limitations. Because the TLDN list 150 contains a limited number of directory numbers, the numbers have to be recycled once they are released by a particular emergency call. In order to determine when the assigned TLDN number can be reused, the serving MSC/VLR 40 marks the assigned numbers as released after a certain period of time. For example, forty-five minutes after a particular TLDN number has been assigned to the mobile station 30, the assigned TLDN number is released and the data within the register (R) 140 correlating the assigned TLDN with the mobile station 30 are deleted. As a result, if a call back request from the PSAP 110 is received after the assigned TLDN has already been released, the call back request fails. Moreover, if the number of emergency calls ever exceeds the number of available TLDNs in the list 130, subsequently received emergency call setup requests have to be processed without assigning TLDNs. Alternatively, the serving MSC/VLR 40 has to overwrite some of the previously assigned TLDNs with the subsequently received call setup requests using a recycling mechanism such as first-in-first-out (FIFO).

Figure 3:
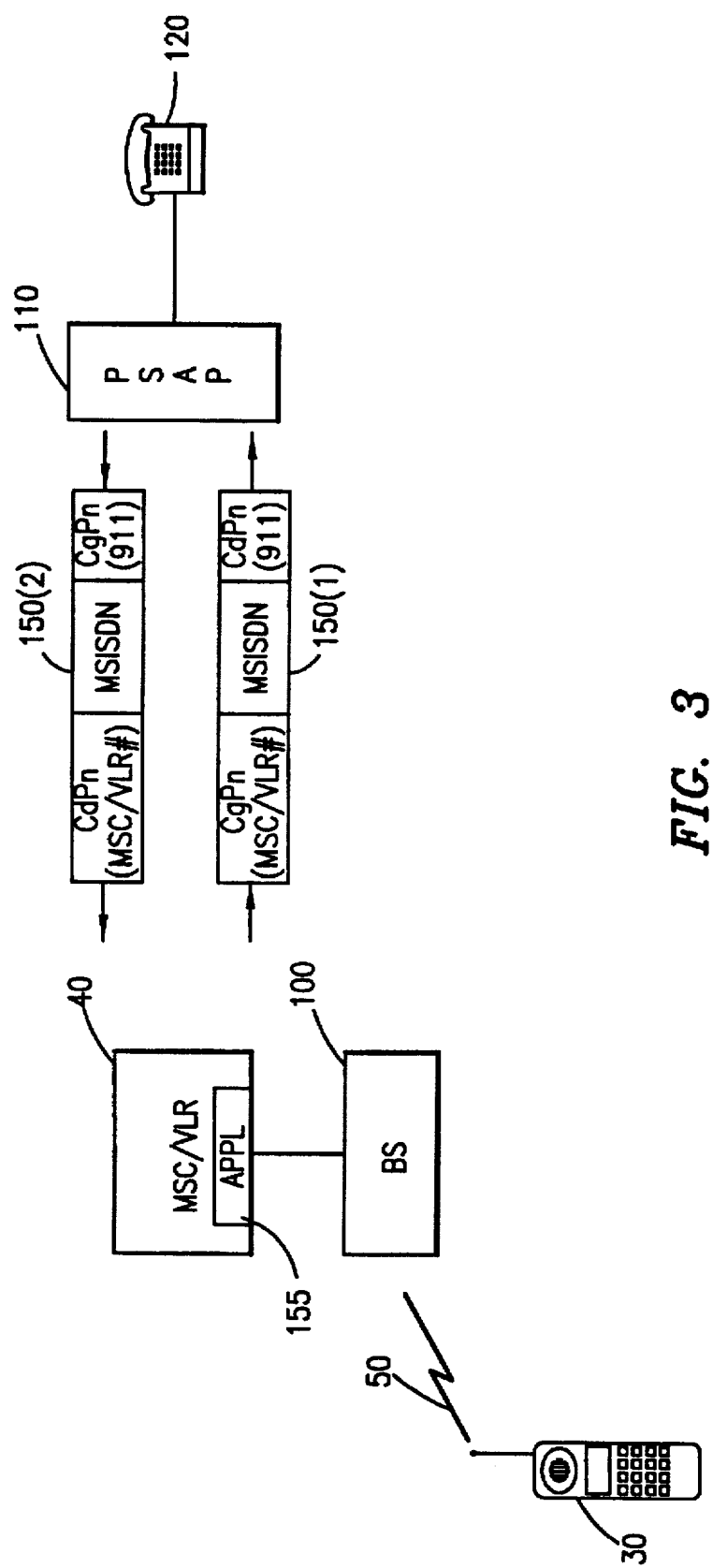
FIG. 3 is a block diagram illustrating the communication of a mobile switching center (MSC) directory number as the Calling Party Number (Cgpn) between the MSC/VLR and the PSAP.

Reference is now made to FIG. 3 where the communication of a MSC directory number as the Cdpn between the serving MSC/VLR 40 and the PSAP 110 is shown in accordance with the teachings of the present invention. The MSC directory number assigned to a particular MSC/VLR is usually utilized by the MSC/VLR to communicate data with an HLR. Such communications between an MSC/VLR and an HLR includes a location update process performed by a new MSC/VLR whenever a mobile station enters a new MSC/VLR coverage area. Since the MSC directory number is a wireline number representing the MSC/VLR node 40 within a telecommunications network, such communications between the MSC/VLR 40 and the HLR do not have to perform the previously described undesirable HLR interrogation and GMSC routing procedures.

The mobile station 30 transmits an emergency call setup signal with the assigned MSISDN as the Cgpn to request an emergency call connection with the PSAP terminal 120. The serving MSC/VLR 40 receives the setup request signal via the BS 100 and then transmits the first IAM signal 150(1) requesting a call connection to the PSAP 110. While transmitting the first IAM signal 150(1), an application module 155 within the serving MSC/VLR 40 transmits the directory number assigned to the serving MSC/VLR 40 as the Cgpn. While transmitting the first IAM signal 150(1) with the MSC directory number as the Cgpn, the MSISDN assigned to the mobile station 30 is further encapsulated into one of the optional parameters. The first emergency call connection is then established between the mobile station 30 and the PSAP terminal 120. As far as the PSAP is concerned, the calling party for this particular call connection is the MSC/VLR 40 instead of the mobile station 30. If the first emergency call connection is disconnected and the PSAP wishes to call back the mobile station 30, a second IAM signal 150(2) with the received MSC directory number as the Cdpn is transmitted. The received MSISDN representing the mobile station 30 is further included with the second IAM signal 150(2). The call setup request is accordingly routed to the serving MSC/VLR 40 as indicated by the specified Cdpn. The application module 155 within the serving MSC/VLR 40 then extracts the encapsulated MSISDN number representing the mobile station 30, determines the particular mobile station 30 to be alerted, and accordingly establishes the call back connection with the determined mobile station 30.

By utilizing the MSC directory number as the Cdpn, the call back setup request signal generated by the PSAP 110 can be directly routed to the serving MSC/VLR 40 circumventing the undesirable incoming mobile call setup procedures described in FIG. 1. Because the MSISDN representing the emergency mobile station 30 is further "piggybacked" onto the first IAM signal 150(1) and "piggybacked" returned on the second IAM signal 150(2) transmitted back by the PSAP 110, there is no need for the serving MSC/VLR 40 to retain data correlating the MSISDNs representing the mobile stations with the transmitted MSC directory number.

FIG. 4 is a block diagram illustrating the data structure of the IAM signal 150 communicated between the serving MSC/VLR 40 and the PSAP for establishing a call connection. In accordance with the teachings of the present invention, whenever the serving MSC/VLR transmits an IAM signal 150 to establish an emergency call connection with the PSAP, the MSC directory number is transmitted as the Cgpn parameter 200. The MSISDN assigned to the mobile station is further encapsulated into one of the optional parameters such as a Generic Address Parameter (GAP) 210 within the transmitted IAM signal 150. Whenever the PSAP attempts to call back the mobile station, the subsequently transmitted IAM signal 150 contains the received MSC directory number as the Cdpn parameter 220. The received MSISDN value within the GAP 210 is further returned to the serving MSC/VLR without modification in accordance with the teachings of the present invention. As described in FIG. 3, the serving MSC/VLR then extracts the encapsulated MSISDN from the GAP 210 and accordingly establishes the call back connection with the mobile station in need.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for establishing a call back from a wireline telecommunications terminal to a mobile station within a mobile telecommunications system, said mobile station assigned a mobile station identification number and associated with a home location register (HLR), wherein said mobile station is currently being served by a mobile switching center (MSC), said MSC assigned an dialable wireline directory number, and wherein said method comprising the steps of:

receiving a connection request signal with said dialable wireline directory number as a called party number by said MSC, said connection request signal further encapsulating said mobile station identification number and routed to said MSC without previously performing an interrogation of said home location register for said mobile station;

extracting said encapsulated mobile station identification number from said connection request signal; and establishing a call back connection towards said mobile station with said extracted mobile station identification number as said called party number.

2. The method of claim 1 wherein said telecommunications terminal comprises a Public Safety Answering Point (PSAP) terminal.

3. The method of claim 1 wherein said mobile station identification number comprises a Mobile Station Integrated Services Digital Number (MSISDN).

4. The method of claim 1 wherein said connection request signal comprises an Initial Address Message (IAM).

5. The method of claim 1 wherein said call back is in response to a disconnection of an initial call connection between said wireline terminal and said mobile station and wherein said method further comprises the step of transmitting a setup signal containing said mobile station identification number and said dialable wireline directory number from said MSC to said telecommunications terminal for establishing said initial emergency call connection.

6. The method of claim 5 wherein said setup signal comprises an Initial Address Message (IAM).

7. The method of claim 6 wherein said dialable wireline directory number is transmitted as a Calling Party Address for said IAM.

8. The method of claim 7 wherein said mobile station identification number is encapsulated into said IAM.

9. The method of claim 8 wherein said IAM comprises a Generic Address parameter (GAP) encapsulating said mobile station identification number.

10. A system for establishing a call back connection between a mobile station and a telecommunications terminal, said mobile station assigned a mobile station identification number and served by a mobile switching center (MSC), said MSC further assigned a MSC identification number, said system comprising:

means for receiving a first signal requesting a call connection towards said telecommunications terminal from said mobile station by said MSC;

means for transmitting a second signal, said second signal establishing said call connection between said mobile station and said telecommunications terminal, said second signal transmitted with said MSC identification number as a Calling Party Number (Cgpn) and said second signal encapsulating said mobile station identification number;

means for receiving a third signal at said MSC in response to a disconnection of said call connection, said third signal containing said MSC identification number as a Called Party Number (Cdpn) and further encapsulating said mobile station identification number;

means for extracting said encapsulated mobile station identification number from said third signal; and means for establishing a call back connection using said extracted mobile station identification number as said Cdpn.

11. The system of claim 10 wherein said second signal comprises an Initial Address Message (IAM) signal.

12. The system of claim 11 wherein said IAM signal contains a Generic Address Parameter (GAP) encapsulating said mobile station identification number.

13. The system of claim 11 wherein said telecommunications terminal comprises a Public Safety Answering Point (PSAP).

14. The system of claim 11 wherein said mobile station identification number comprises a Mobile Station Integrated Services Digital Number (MSISDN).

15. A method for establishing a call connection between a mobile station and a telecommunications terminal, said mobile station assigned a mobile station (MS) identification number, said method comprising the steps of:

transmitting a first signal requesting a call connection with said telecommunications terminal by said mobile station, said first signal comprising a first Calling Party Number (Cgpn) parameter storing said MS identification number;

receiving said first signal by a mobile switching center (MSC) serving said mobile station, said MSC assigned a MSC identification number;

transmitting a second signal requesting a call connection with said telecommunications terminal by said MSC, said second signal comprising a second Calling Party Number (Cgpn) parameter storing said MSC identification number and said second signal further encapsulating said MS identification number;

establishing said call connection between said mobile station and said telecommunications terminal in response to said second signal;

responsive to a failure of said call connection, transmitting a third signal requesting a call back connection with said mobile station by said telecommunications terminal, said third signal comprising a Called Party Number (Cdpn) parameter storing said MSC identification number and said third signal further encapsulating said MS identification number;

receiving said third signal by said MSC;

extracting said encapsulated MS identification number; and establishing a call back connection towards said mobile station by said MSC, said call back connection established utilizing said extracted MS identification number as a Called Party Number (Cdpn).

16. The method of claim 15 wherein said MS identification number comprises a Mobile Station Integrated Service Digital Number (MSISDN).

17. The method of claim 15 wherein said MSC identification number comprises a telecommunications directory number assigned to said MSC.

18. The method of claim 15 wherein said third signal comprises an Initial Address Message (IAM).

19. The method of claim 18 wherein said IAM comprises a Generic Address Parameter (GAP) encapsulating said MS identification number.

20. The method of claim 15 wherein said telecommunications terminal comprises a Public Safety Answering Point (PSAP) terminal.

21. A method for handling an emergency mobile call, said method comprising the steps of:

responsive to a mobile station emergency dialing, transmitting a first call setup request signal for establishing a first call connection between a mobile station and a Public Safety Answering Point (PSAP), said first call setup request signal identifying said PSAP as a called party number (Cdpn) and a directory number associated with a serving mobile switching center (MSC) as a calling party number (Cgpn), the first setup request signal further including a parameter storing a mobile station Integrated Service Directory Number (MSISDN) assigned to said mobile station;

responsive to a disconnection of said first call connection, transmitting a second call setup request signal identifying said PSAP as the Cgpn and said directory number associated with said serving MSC as the Cdpn, the second call setup request signal further including a parameter storing said MSISDN; and extracting said MSISDN from said received second call setup request signal by said serving MSC for establishing a call back connection with said mobile station.

22. The method of claim 21 wherein said first call setup request signal comprises an Initial Address Message (IAM).

23. The method of claim 22 wherein said IAM includes a Generic Address Parameter for storing said MSISDN.

* * * * *